G. EKLUND.
DRIVING MECHANISM FOR VELOCIPEDES.
APPLICATION FILED DEC. 10, 1920.
1,425,082.
Patented Aug. 8, 1922.
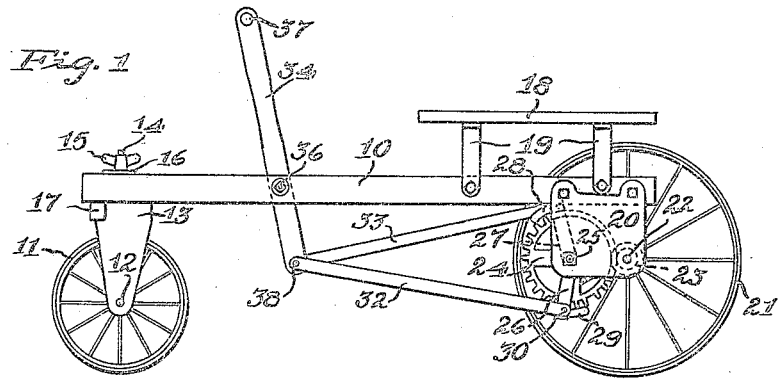
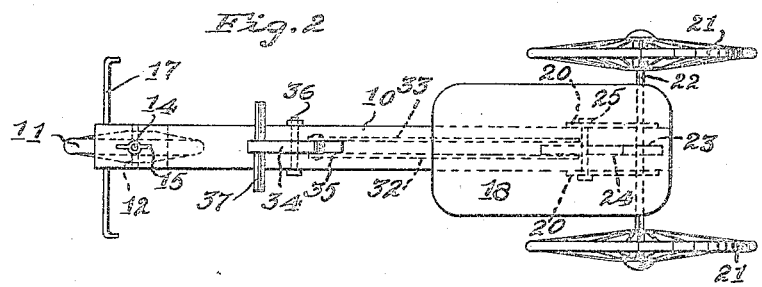
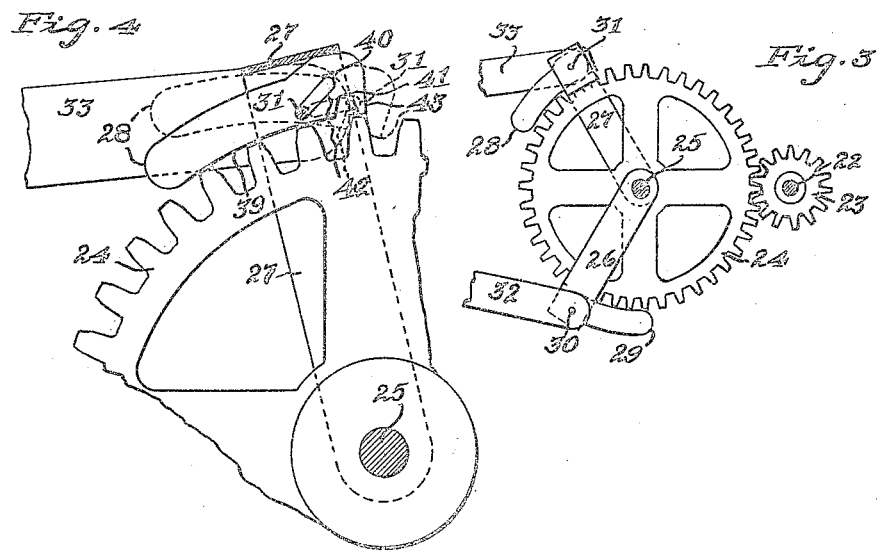
Inventor:
Georg Eklund
by: John F. Stryker
his Attorney.

UNITED STATES PATENT OFFICE.

GEORG EKLUND, OF WINONA, MINNESOTA.

DRIVING MECHANISM FOR VELOCIPEDES.

1,425,082. Specification of Letters Patent. Patented Aug. 8, 1922.

Application filed December 10, 1920. Serial No. 429,772.

*To all whom it may concern:*

Be it known that I, GEORG EKLUND, a citizen of the United States, residing at Winona, in the county of Winona and State of Minnesota, have invented new and useful Improvements in Driving Mechanism for Velocipedes, of which the following is a specification.

The object of my invention is to provide simple and efficient driving mechanism for a velocipede of the type which is propelled by oscillating a lever.

A further object of my invention is to provide mechanism of this kind which is unusually quiet in operation.

Another object of my invention is to provide a device of this kind with pawls which are adapted to engage and rotate a spur gear of the usual type having teeth that are symmetrical in outline.

Other objects will appear and be more fully pointed out in the following specification and claims.

The accompanying drawings illustrate what I at present believe to be the best form of my device. Figure 1 is an elevation of a velocipede having my driving mechanism mounted thereon, one wheel being removed to show parts otherwise concealed; Fig. 2 is a plan view of the same; Fig. 3 is an elevation of the driving mechanism proper and Fig. 4 is an enlarged detail of one of the pawls together with portions of the adjacent parts of the driving mechanism.

In the drawings I have used the numeral 10 to indicate the central beam of the frame of a velocipede. The front wheel 11 is freely revoluble on an axle 12 which is secured at its ends in the lower end of a steering fork 13. A vertical stud 14, rigidly fastened to the fork 13, is revoluble in the forward end of the beam 10 and a wing nut 15 and washer 16, on the upper end of the stud 14, hold said stud within the perforation in the beam 10. A cross bar 17 rigidly secured to the fork 13 beneath the beam 10 forms a rest for the feet of a child sitting on the seat 18 of the velocipede and also affords means for steering the vehicle. The seat 18 is supported on pairs of brackets 19 which are rigidly bolted to the beam 10 near its rear and a pair of downward projecting plates 20, bolted to opposite faces of the beam 10 beneath the seat 18, form a mounting for the driving mechanism. The rear wheels 21 are mounted on an axle 22 which is journalled in the plates 20, one of the wheels 21 being fast upon the axle 22 and the other loosely journalled thereon.

Rigidly mounted near the middle point of the axle 22 is a pinion gear 23 which meshes with a spur gear 24 hereinafter more particularly described. This spur gear is revoluble on a bolt 25 supported at its ends in the plates 20 and a pair of radius rods 26 and 27 are tiltably mounted on the bolt 25 adjacent to opposite faces of the gear 24. These radius rods project beyond the outer periphery of the gear 24 and are then bent across the face of the gear and back upon themselves to form U-shaped supports for the pawls 28 and 29, respectively. Each of a pair of link rods 32 and 33 is connected at one end to the hand lever 34 and these rods are severally pivoted to the outer ends of the rods 26 and 27 by means of pins 30 and 31. The hand lever 34 passes through a slot 35 (Fig. 2) in the beam 10 and is tiltably connected to said beam by a bolt 36. A cross bar 37 at the upper end of the lever 34 forms grips for manipulating said lever and a bolt 38, passing through perforations in the rods 32 and 33 and the lower end of the lever 34, forms a pivotal connection between said rods and lever. The pawls 28 and 29 are identical (see Fig. 4) and are adapted to rotate the spur gear 24 which has symmetrical teeth. The pawl body is formed with a surface 39 which is adapted to rest upon a plurality of the gear teeth during the idling or disengaged stroke and a slot 40 through said pawl is formed to receive the pin 31 for connecting said pawl to the outer end of the radius rod 27 and rearward end of the link rod 33. This slot 40 is arranged at an oblique angle across the pawl 28 so that in the idling or disengaged position said slot will be at an oblique angle transverse the radius rod 27. A notch 41 in the pawl 28 adjacent to the slot 40 is formed to receive one of the gear teeth.

In operation a child seated on the seat 18 places his feet on the cross bar 17 and imparts oscillating motion to the lever 34. This transmits an oscillating motion to the rods 32 and 33 and reciprocating tilting motion to the rods 26 and 27 carrying the pawls 28 and 29. On the backward stroke of the rods 32 and 33 the pawl 28 starts in the position shown in Fig. 4 and is carried rearwardly by the pin 31. As the movement starts, the pin 31, coming in contact with the inclined surface 42 of the slot 40, tends to force this end of the pawl 28 downward and as soon as the point 43 of said pawl slips off the end of a gear tooth the pawl will tilt to the dotted line position shown in Fig. 4 and engage the tooth in the notch 41. Further motion of the rod 33 in this direction will rotate the gear 24 in mesh with the pinion 23 and cause a forward movement of the velocipede. On the return or forward movement of the rods 32 and 33 the pawl 28 will again be brought to the full line position shown in Fig. 4, the pawl being supported at one end by a plurality of the gear teeth in contact with the surface 39 and at its other end by the pin 31, and the pawl 29 will be caused to tilt and rotate the gear 24 as described above on the opposite stroke of the pawl 28. Thus by oscillating the lever 34 the pawls 28 and 29 are alternately caused to engage, rotate and release the gear 24 for driving the velocipede. By constructing the pawls 28 and 29 so as to rest upon a plurality of the gear teeth on the idling or disengaged stroke the usual "chattering" noise is largely eliminated and by making it possible to use a spur gear having teeth with symmetrical faces and flanks a more efficient and smoother running vehicle is obtained. It also cheapens the construction by permitting the use of a standard supr gear.

Having described my invention what I claim as new and desire to protect by Letters Patent is:

1. In driving mechanism for a velocipede having a frame and a drive wheel, a spur gear operatively connected to said drive wheel, a tiltable support for a pawl at the periphery of said gear, a pawl having a notch to receive the teeth of said gear and a slot through said pawl to receive a pin, a single pin through said slot connecting said pawl to said support and means for oscillating said pawl wehereby said pin will press said pawl to engage the teeth of the gear to rotate the same.

2. In driving mechanism for a velocipede having a frame and a drive wheel, a spur gear journalled in said frame, means operatively connecting said gear with said drive wheel, radius rods for supporting pawls at the periphery of said gear, pawls formed to be supported at one end by a plurality of teeth of said gear and conected by a pin at their opposite ends to said radius rods, notches in said pawls adjacent to said pins and means for oscillating said pawls and for causing them to engage the teeth of said gear in said notches.

3. In driving mechanism for a velocipede having a frame and a drive wheel, a spur gear operatively connected to said drive wheel, a tiltable support for a pawl at the periphery of said gear, a pawl having a notch to receive the teeth of said gear and a slot through said pawl at one end to receive a pin, the opposite end of said pawl being supported on a plurality of the teeth of said gear, a pin through said slot and said support and means for oscillating said pawl to cause said pawl to be pressed upon and engage the teeth of said gear in the notch in said pawl for rotating said gear.

4. In a velocipede a frame, a driving wheel and a spur gear journalled in said frame, means operatively connecting said gear with said wheel, a pair of radius rods tiltably mounted in said frame adjacent to said gear, a hand lever tiltably mounted in said frame, link rods, joining the lower end of said lever with said rods, pawls mounted near the ends of said radius rods and means for causing said pawls to engage the teeth of said gear comprising a notch in one end of each of said pawls, a slot through each of said pawls adjacent to said notch, and a pin passing through each of said slots and radius rods whereby tilting said hand lever will cause said pawls to tilt and engage the teeth of said gear in said notches.

5. In a device of the class described, a frame, an axle journalled in said frame, a gear wheel operatively connected to said axle, a tiltable support for a pawl concentric with said gear wheel, a pawl extending circumferentially on said wheel, a surface on said pawl eccentric with said gear wheel, a pin arranged to bear upon said surface and connecting said pawl with said support and means for oscillating said support.

6. In a device of the class described, a frame, an axle journalled in said frame, a gear wheel operatively connected to said axle, a tiltable support for a pawl concentric with said gear wheel, a pawl extending circumferentially on said wheel and supported at one end by a plurality of the teeth of said wheel, a surface on said pawl eccentric with said gear wheel, a pin arranged to bear upon said surface and connecting said pawl with said support and means for oscillating said support.

7. In driving mechanism for a velocipede having a frame and a driving wheel, a spur gear having teeth symmetrical in outline journalled in said frame, means operatively connecting said gear with said driving wheel, upwardly and downwardly extending radius rods for supporting pawls at the periphery of said gear, pawls, formed with notches, supported at one end by a plurality of teeth of said gear and connected by a pin at their opposite ends to said radius rods, means for oscillating said pawls and for causing them to engage the teeth of said gear in said notches.

8. In dirving mechanism for a velocipede having a frame and a drive wheel, a spur gear journalled in said frame and operatively connected to said drive wheel, radius rods for supporting pawls at the periphery of said gear, pawls formed with slots therein, said slots being arranged at oblique angles transverse said pawls, pins through said slots and connecting said pawls to said radius rods and means for imparting reciprocating tilting motion to said radius rods.

9. In driving mechanism for a velocipede having a frame and a driving wheel a spur gear journalled in said frame and operatively connected to said drive wheel, a radius rod for supporting a pawl at the periphery of said gear, a pawl adapted to be supported at one end by a plurality of the teeth of said gear and having a slot arranged diagonally across said pawl, a pin through said slot for connecting said pawl to said radius rod and means for imparting reciprocating tilting motion to said radius rod.

10. In driving mechanism for a velocipede having a frame and a driving wheel a spur gear journalled in said frame and operatively connected to said drive wheel, a radius rod for supporting a pawl at the periphery of said gear, a pawl formed to be supported at one end by a plurality of the teeth of said gear and having a slot arranged at an oblique angle transverse said pawl, a pin through said slot for connecting said pawl to said radius rod, a notch in said pawl formed to engage the teeth of said gear, and means for imparting reciprocating tilting motion to said radius rod.

In testimony whereof, I have hereunto subscribed my name to this specification.

GEORG EKLUND.